US012655818B2

(12) United States Patent
Chen et al.

(10) Patent No.: US 12,655,818 B2
(45) Date of Patent: Jun. 16, 2026

(54) HYDROGEN GENERATOR FOR INTERNAL COMBUSTION ENGINES

(71) Applicant: MV DEFENSE LLC, Livermore, CA (US)

(72) Inventors: Ru Chen, Dublin, CA (US); Ian W. Kaye, Livermore, CA (US)

(73) Assignee: MöbiVolt Defense LLC, Livermore, CA (US)

( * ) Notice: Subject to any disclaimer, the term of this patent is extended or adjusted under 35 U.S.C. 154(b) by 64 days.

(21) Appl. No.: 18/753,585

(22) Filed: Jun. 25, 2024

(65) Prior Publication Data

US 2025/0020094 A1 Jan. 16, 2025

Related U.S. Application Data

(60) Provisional application No. 63/513,146, filed on Jul. 12, 2023.

(51) Int. Cl.
*F02M 27/04* (2006.01)
*F02M 25/00* (2006.01)

(52) U.S. Cl.
CPC ............ *F02M 27/04* (2013.01); *F02M 25/00* (2013.01)

(58) Field of Classification Search
CPC ........ F02M 27/04; F02M 25/00; F02M 25/12; F01N 5/02; F01N 3/2066; F01N 2610/02; F01N 2610/10; F01N 2610/1406; F01N 2610/1453
See application file for complete search history.

(56) References Cited

U.S. PATENT DOCUMENTS

| | | | | |
|---|---|---|---|---|
| 7,721,682 | B2 * | 5/2010 | Fulton | H01M 8/0606 123/3 |
| 7,861,696 | B2 | 1/2011 | Lund | |
| 8,739,743 | B2 * | 6/2014 | Mingilino | C25B 11/00 123/3 |
| 9,945,299 | B2 | 4/2018 | Lund | |
| 2019/0242282 | A1 * | 8/2019 | Li | F01N 13/009 |

OTHER PUBLICATIONS

Zamfirescu et al., Utilization of hydrogen Produced from Urea on Board to Improve Performance of Vehicles, 36 International Journal of Hydrogen Energy, pp. 11425-11432 (2011). (Year: 2011).*
Cummins Newsroom, "6 Answers About Diesel Exhaust Fluid", https://www.cummins.com/news/2016/01/04/6-answers-about-diesel-exhaust-fluid, Jan. 4, 2016, downloaded from the internet on Sep. 30, 2024.
Energy.Gov, "U.S. National Clean Hydrogen Strategy and Roadmap", https://www.hydrogen.energy.gov/library/roadmaps-vision/clean-hydrogen-strategy-roadmap, Sep. 2022, downloaded from the internet on Sep. 30, 2024.

(Continued)

*Primary Examiner* — Grant Moubry
(74) *Attorney, Agent, or Firm* — Beyer Law Group LLP

(57) ABSTRACT

Hydrogen generation systems and processes are described that facilitate on-board generation of hydrogen for use in internal combustion engines. A hydrogen generator converts diesel exhaust fluid (DEF) or other urea-based fluids into a hydrogen-rich product gas. In some embodiments waste heat from the engine is used to preheat the DEF for the hydrogen generator. Steam reformers, electrolyzers and fuel reformers that generate hydrogen using the DEF are described.

32 Claims, 6 Drawing Sheets

(56) References Cited

OTHER PUBLICATIONS

Marcinkoski et al., DOE Advanced Truck Technologies, Program Record, "Hydrogen Class 8 Long Haul Truck Targets", https://www.hydrogen.energy.gov/pdfs/19006_hydrogen_class8_long_haul_truck_targets.pdf, Oct. 31, 2019, 31 pages, downloaded from the internet on Sep. 30, 2024.

Saravanan et al., "Experimental Investigation of Hydrogen Port Fuel Injection in DI Diesel Engine", May 25, 2007, International Journal of Hydrogen Energy 32 (2007) pp. 4071-4080.

Saravanan et al., "An Experimental Investigation of Hydrogen-Enriched Air Induction in a Diesel Engine System", Feb. 20, 2008, International Journal of Hydrogen Energy 33 (2008), pp. 1769-1775.

Cernat et al., "The Influence of Hydrogen on Vaporization, Mixture Formation and Combustion of Diesel Fuel at an Automotive Diesel Engine", Sustainability 2021, 13, 202. https://doi.org/10.3390/su13010202, Dec. 28, 2020, 16 pages.

Green Car Congress, ArvinMeritor to Sell its Emissions Technologies Group, Feb. 2, 2007, https://www.greencarcongress.com/2007/02/arvinmeritor_to.html, downloaded from the internet on Sep. 30, 2024.

Rollinson, "Hydrogen Production by Catalytic Steam Reforming of Urea", 5th International Ege Energy Symposium and Exhibition (IEESE-5) Jun. 27-30, 2010, downloaded on Sep. 30, 2024, 7 pages.

Chen et al., "Development of a Non-Catalytic JP-8 Reformer", 2018 NDIA Ground Vehicle Systems Engineering Symposium, Aug. 7-9, 2018, 7 pages.

Chen SC, et al., "An onboard hydrogen generator for hydrogen enhanced combustion with internal combustion engine", International Journal of Hydrogen Energy (2017), http://dx.doi.org/10.1016/j.ijhydene.2017.03.013, 9 pages.

Wang et al., "Review on Blended Hydrogen-Fuel Internal Combustion Engines: A Case Study for China", https://doi.org/10.1016/j.egyr.2022.04.079, Energy Reports Aug. 2022 pp. 6480-6498, May 18, 2022.

* cited by examiner

HYDROGEN GENERATOR FOR INTERNAL COMBUSTION ENGINES

CROSS-REFERENCE TO RELATED APPLICATIONS

The present application claims the priority of U.S. Provisional Patent Application No. 63/513,146 filed Jul. 12, 2023, which is incorporated herein by reference in its entirety.

FIELD

The present disclosure relates generally to integrated hydrogen generators for internal combustion engines using logistically available reactants. In some embodiments, diesel exhaust fluid (DEF) is used as the hydrogen source. In some embodiments, engine fuel is mixed with the DEF in the hydrogen generator.

BACKGROUND

Hydrogen injection is known to increase fuel efficiency and improve exhaust emission characteristics of diesel and other internal combustion engines (ICEs). A challenge to wide-spread use of hydrogen injection is that hydrogen is not presently commercially available on a scale suitable for use in most applications. In vehicular applications, another challenge is that although hydrogen could potentially be stored in high pressure gas cylinders, there are potential safety hazards associated with storing high pressure hydrogen. Additionally, the amount of hydrogen that can be stored is limited. Therefore, onboard hydrogen generation is generally considered a safer approach.

Some efforts have been made to generate hydrogen onboard during operation of an engine from engine fuels (e.g., from diesel fuel or gasoline) using a plasma reformer. However, plasma fuel reformers typically require significant amounts of electricity and it is challenging to maintain stable plasma conditions since plasma discharges are sensitive to variations in fuel composition, temperature, and pressure.

Others have proposed steam reforming methanol to provide an onboard hydrogen source. However, the methanol/water mixture required for steam reformation is not readily available on a commercial scale and would require an additional container to store the mixture.

To date, none of the proposed onboard hydrogen generation approaches have attained widespread commercial success. Accordingly, there is a need for improved processes and equipment to facilitate the onboard generation of hydrogen for use in internal combustion engines.

SUMMARY

A variety of hydrogen generation systems and processes are described that facilitate on-board generation of hydrogen for use in internal combustion engines. In one aspect, a hydrogen-rich gas is generated from a urea-based fluid during operation of the engine. The air, fuel and at least some hydrogen from the hydrogen-rich gas are supplied to the engine working chamber(s) to provide a hydrogen enhanced air-fuel mixture.

In some embodiments the urea-based fluid is diesel exhaust fluid. In other embodiments, urea-based fluids having different urea/water concentrations, and/or additional components may be utilized.

In some embodiments, the urea-based fluid is heated prior to or within the hydrogen generator using heat from exhausts gases generated by operation of the engine. These may include exhaust gas recirculation gas and/or exhaust gases to be expelled from the system. In some embodiments, preheating boils the urea-based fluid and causes the urea to decompose into ammonia and carbon dioxide. In other embodiments other waste engine heat is used to heat/preheat the urea-based fluid either in addition to, or in place of exhaust gases. In other embodiments, a burner or electric heater may be used to provide desired heating.

In some embodiments, the heated urea-based fluid is steam reformed to generate the hydrogen-rich gas. In some embodiments, at least some water in the hydrogen-rich gas is electrolyzed to create additional hydrogen in the hydrogen rich gas. In others, at least some water in the hydrogen-rich gas is condensed and removed from the hydrogen-rich gas prior to supplying the hydrogen-rich gas to the engine.

In some embodiments the urea-based fluid is electrolyzed to generate the hydrogen-rich gas. In some embodiments, the electrolyzation of the urea-based fluid includes: (i) a first electrolysis stage that electrolyzes urea in the urea-based fluid to generate some hydrogen; and (ii) a second electrolysis stage that electrolyzes water in the urea-based fluid to generate additional hydrogen.

In some embodiments the engine is a compression engine, as for example, a diesel engine.

In an apparatus aspect, a hydrogen generation and delivery system includes a diesel exhaust fluid tank, a hydrogen generator configured to receive diesel exhaust fluid from the tank and generate a hydrogen rich gas from the diesel exhaust fluid; and injectors configured to inject at least some hydrogen from the hydrogen-rich gas into the engine to facilitate use of the hydrogen enhanced air-fuel mixture.

In another aspect, a hydrogen generator for generating hydrogen on-board an engine during operation of the engine is described. In some embodiments, the hydrogen generator is or includes a steam reformer that generates hydrogen from diesel exhaust fluid (or other urea-based fluid). In some embodiments, the hydrogen generator further includes a steam electrolyzer that electrolyzes water vapor in gases outputted by the steam reformer to generate additional hydrogen.

In other embodiments, the hydrogen generator is or includes an electrolyzer that electrolyzes the diesel exhaust fluid to generate at least some of the hydrogen.

In still other embodiments, the hydrogen generator is or includes a fuel reformer that generates hydrogen from an engine fuel and the diesel exhaust fluid. In some embodiments, the fuel reformer is a non-catalytic thermal partial oxidation reformer.

In some embodiments the system includes one or more heat exchangers that preheat the diesel exhaust fluid before it is conveyed to the hydrogen generator. In some embodiments, one of the heat exchangers uses exhaust gases expelled from the exhaust system as a heat source. In some embodiments, one of the heat exchangers uses EGR gases as a heat source.

In some embodiments, a condenser is provided to condense and remove water from the hydrogen rich gas before the hydrogen rich gas passes to the hydrogen injectors.

BRIEF DESCRIPTION OF THE DRAWINGS

The invention and the advantages thereof, may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION

The present disclosure relates to hydrogen generation systems and processes that utilize diesel exhaust fluid (DEF) or other urea-based fluids to produce hydrogen-rich product gas in-line for use in internal combustion engines. A hydrogen injection system is used to supply the generated hydrogen to the engine. Hydrogen enhanced combustion in internal combustion engines can increase thermal efficiency of the engine and reduce harmful emissions. In various embodiments, catalyst-based reformation, partial oxidation reformation, electrolysis and/or combinations thereof are utilized to generate the hydrogen.

Waste heat from the engine may be used to improve the thermal efficiency of a reformer by pre-boiling liquid reactants, reducing heat loss and even providing some or all of the heat for reforming. In some embodiments, the fuel used in the engine (e.g., diesel, kerosene, JP8, JP5, gasoline, natural gas, etc.) may be mixed with the DEF/urea-based fluid in the hydrogen generator in order to increase the reformer's efficiency.

In some embodiments, steam electrolysis may be used to generate hydrogen from water in the gases outputted from the reformer. In other embodiments electrolysis may be used to directly generate hydrogen from the DEF.

Figure 1:
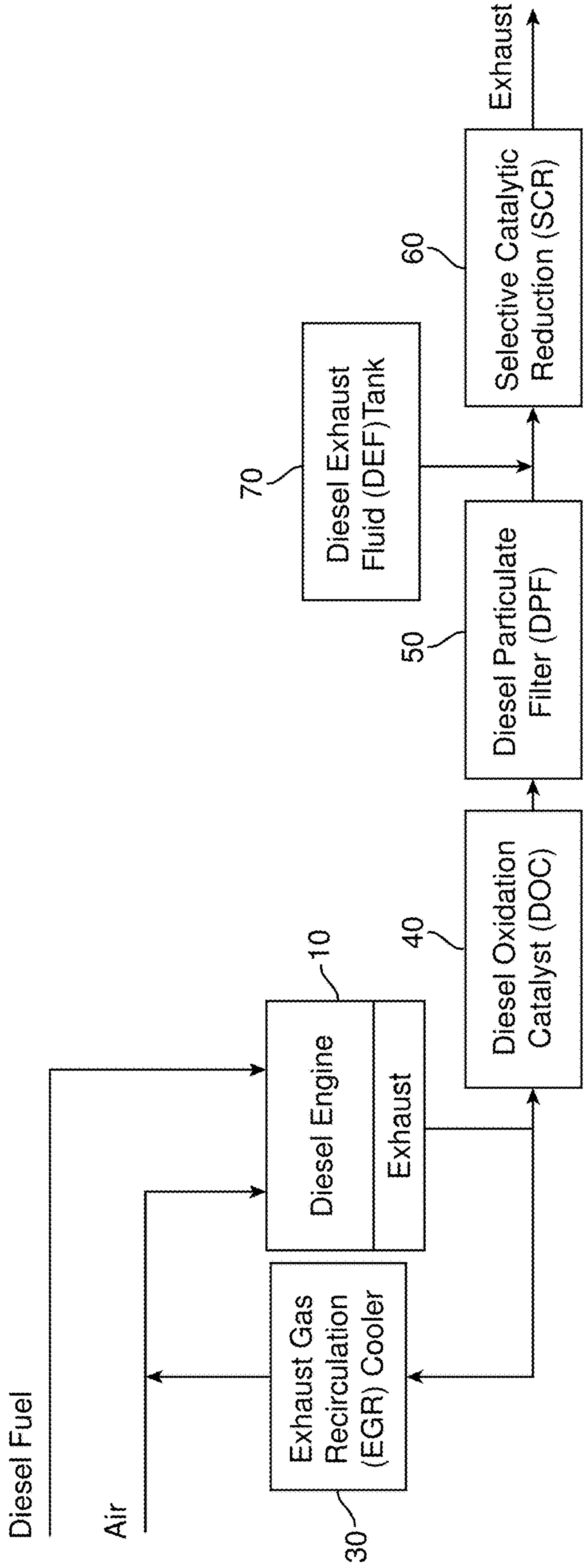
FIG. 1 (PRIOR ART)
FIG. 1 is a block schematic diagram that diagrammatically illustrates a prior art diesel emission control system.

Most manufacturers of heavy-duty diesel engines use a combination of emission control strategies. A representative diesel exhaust system is diagrammatically illustrated in FIG. 1. Air and fuel are introduced to an engine block 10 and combusted in the engine's working chambers (e.g., cylinders). Some of the engine's exhaust gases are recirculated back to the engine through an exhaust gas recirculation system. Recirculated exhaust gases are typically cooled by an EGR cooler 30 before they are recirculated to the engine. Frequently the EGR cooler 30 takes the form of a heat exchanger that uses engine coolant as the cooling medium.

Exhaust gases that are expelled from the system pass through various emission control systems. In the illustrated diesel exhaust system, the emission control systems include a Diesel Oxidation Catalyst (DOC) 40, a Diesel Particulate Filter (DPF) 50, and a Selective Catalytic Reduction system (SCR) 60. Also, the exhaust gases may pass through other components, as for example, the compressor of a turbocharger (not shown). Indeed, turbocharges are very commonly used in modern diesel engines.

Exhaust temperature can reach 550-650° C. or higher. DOC catalysts are typically based on Platinum Group Metals with typical operating temperature ranges on the order of 200 to 500° C. SCR catalysts are typically based on a vanadium compound and other materials supported on a titanium oxide with typical operating temperature range from 250 to 450° C.

The Selective Catalytic Reduction (SCR) system 60 is used to reduce NOx to nitrogen and water by injecting a urea-based solution commonly referred to as Diesel Exhaust Fluid (DEF) into the exhaust stream. SCR is even mandatory for heavy-duty trucks, buses, trains and passenger vehicles in some jurisdictions. As the name implies, DEF is most commonly used in diesel engines, although it is sometimes used on other types of internal combustion engines. Vehicles that incorporate selective catalytic reduction have a separate DEF tank that will vary in size based on the vehicle size and intended use.

DEF is a non-hazardous solution consisting of 32.5% urea and 67.5% deionized water. Truck stops typically have DEF available for purchase. These locations often have dedicated DEF dispensers or DEF packaged in containers. Many gas stations, particularly those that cater to commercial vehicles or trucks, have DEF available at the fueling stations.

When DEF is injected into the hot exhaust gas stream, the water evaporates and the urea thermally decomposes to form ammonia and isocyanic acid at 150-300° C. (R1). It is generally accepted that urea thermal decomposition commences at ca. 133° C. The isocyanic acid reacts with the water vapor and hydrolyses to carbon dioxide and ammonia below 200° C. (R2). The overall reaction is shown in R3.

$$(NH_2)_2CO \rightarrow NH_3 + HNCO \quad \text{(R1)}$$

$$HNCO + H_2O \rightarrow NH_3 + CO_2 \quad \text{(R2)}$$

$$(NH_2)_2CO + H_2O \rightarrow 2NH_3 + CO_2 \quad \text{(R3)}$$

Ammonia, in the presence of oxygen and a catalyst, reduces two different nitrogen oxides:

$$4NO + 4NH_3 + O_2 \rightarrow 4N_2 + 6H_2O \quad \text{(R4)}$$

$$2NO_2 + 4NH_3 + O_2 \rightarrow 3N_2 + 6H_2O \quad \text{(R5)}$$

$$NO + NO_2 + 2NH_3 \rightarrow 2N_2 + 3H_2O \quad \text{(R6)}$$

DEF consumption in diesel engines is roughly 3-5% of the total fuel consumption. For example, on the order of 3-gal of DEF is required when using 100-gal of diesel in a modern truck.

The illustrated exhaust gas recirculation system withdraws exhaust gases directly from the exhaust manifold upstream of the turbocharger (not shown) and is sometimes referred to as a high-pressure EGR system. Other exhaust gas recirculation systems may draw exhaust gases from locations further downstream in the exhaust system. For example, low-pressure EGR systems may draw exhaust gases downstream of the turbocharger and the Diesel Particulate Filter (DPF) 50.

Steam Reforming of Urea

Figure 2:
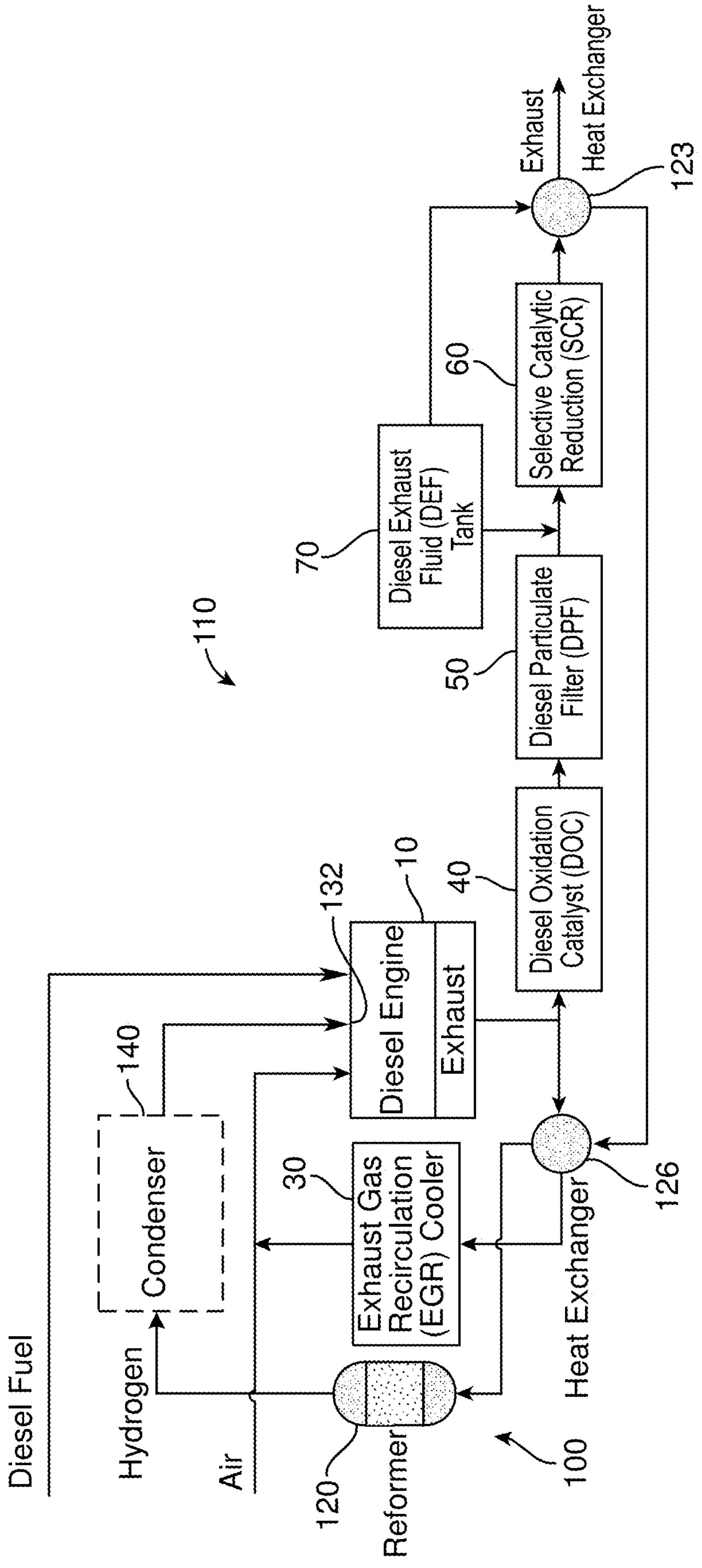
FIG. 2 is a block schematic diagram of a hydrogen generation system for an engine in accordance with one embodiment that used DEF as the hydrogen source and waste heat from the exhaust system to facilitate reformation of the DEF to produce hydrogen.

Referring next to FIG. 2, a DEF based hydrogen generator 100 in accordance with one embodiment will be described. FIG. 2 illustrates an engine 110 that incorporates a hydrogen generation system 100. The illustrated engine 110 has many similarities to the engine illustrated in FIG. 1 but adds steam reformer 120, heat exchangers/preheaters 123, 126 and hydrogen injectors 132.

In the illustrated embodiment, the hydrogen generator system includes preheater 123, 125 and reformer 120. The hydrogen generator system steam reforms urea from DEF. In this embodiment, air, fuel and hydrogen/a hydrogen rich gas are introduced to engine 110 and combusted in the engine's working chambers (e.g., cylinders). Some of the engine's exhaust gases are recirculated back to the engine through an exhaust gas recirculation system. Recirculated exhaust gases pass through heat exchanger 126 before they pass to EGR cooler 30 after which they are recirculated back to the engine.

Exhaust gases that are expelled from the system pass through various emission control systems. The illustrated diesel exhaust system, which utilizes the emission control system of FIG. 1, includes a Diesel Oxidation Catalyst (DOC) 40, a Diesel Particulate Filter (DPF) 50, and a Selective Catalytic Reduction system (SCR) 60. However, other emission control systems may include additional, fewer and/or different emission control components. Also, the exhaust gases may pass through other components, as for example, a turbocharger (not shown) which is commonly deployed in diesel engines.

After passing through the SCR system, the exhaust gases pass through heat exchanger 123. Heat exchangers 123 and 126 are both used to preheat DEF from DEF tank 70 before it is supplied to reformer 120. In the illustrated embodiment, the recirculated exhaust gases fed to heat exchanger 126 are taken from a point in the exhaust stream that is upstream of the SCR 60 and heat exchanger 123 and are therefore significantly hotter than the exhaust gases passing through heat exchanger 123. Therefore, DEF from DEF tank 70 that is fed to the reformer 120 is first preheated by passing through heat exchanger 123 and is thereafter further heated as it passes through heat exchanger 126.

Current SCR catalysts are typically based on a vanadium compound and other materials supported on a titanium oxide. Typical operating temperatures are in the range of 250 to 450° C. As previously mentioned, thermal decomposition of urea begins at 133° C. and generally occurs at temperatures in the range of 150 to 300° C. Thus, the exhaust gases that form the heat source for preheater (heat exchanger) 123 are typically hot enough such that (i) vaporization of the DEF, and (ii) thermal decomposition of the urea, both occur, or at least initiate within preheater 123. Urea is converted to ammonia and carbon dioxide according to chemical reactions R1 and R2 for the overall reaction R3 which is reproduced below.

$$(NH_2)_2CO+H_2O\rightarrow 2NH_3+CO_2 \quad \text{(R3)}$$

The second preheater (heat exchanger) 126 further heats the DEF-based fluid to a temperature suitable for use in steam reformer 120, and preferably ensures that the DEF has been vaporized and the urea has decomposed to ammonia and water before it reaches the catalyst of steam reformer 120.

Within the steam reformer 120, ammonia decomposes into hydrogen and nitrogen. Thus, the overall reaction from urea to the decomposed hydrogen and nitrogen is shown in R7.

$$(NH_2)_2CO+H_2O\rightarrow 2NH_3+CO_2\rightarrow 3H_2+N_2+CO_2 \quad \text{(R7)}$$

Steam reformer 120 utilizes a catalyst to promote such decomposition. A variety of different catalysts can be used within the reformer 120. In some embodiments, Ruthenium-based catalysts are used. In others Nickel-based catalysts are used. In still other embodiments, other ammonia decomposition catalysts may be used. Presently, Cesium promoted Ruthenium is generally considered the most active metal for the decomposition of ammonia. Thus, ruthenium-based catalysts are presently preferred for use in reformer 120 since they obtain the highest conversion at the lowest temperature—e.g., temperatures of the order of 350°-450° C. Nickel-based catalysts yield similar results, but at temperatures between 50° and 600° C. In the future, even better catalysts may be developed. Since temperatures of the exhaust gases fed into high-pressure EGR system can reach 550-650° C. or higher, they are well suited for heating the DEF-based fluid to temperatures suitable for decomposing the fluid within the reformer.

The embodiment illustrated in FIG. 2 utilizes two preheater heat exchangers 123, 126 to vaporize the DEF and decompose the urea into ammonia and water before it is delivered to the catalyst chamber of steam reformer 120. However, it should be appreciated that in other embodiments, more preheaters, or a single preheater may be used. In the illustrated embodiment, one of the preheaters (heat exchanger 123) utilizes exhaust gases downstream of SCR 60 as the heat source and the second preheater (heat exchanger 126) utilizes high pressure EGR gases as the heat source. One of the benefits of this approach is that since heat exchanger 123 is located downstream of the emission control systems and therefore doesn't impact performance of any of the emissions control system components. The second heat exchanger 126 uses EGR gases from an existing EGR system as the working heat source, which again doesn't impact the performance of the emissions control systems components.

Although a particular two heat source approach is shown, it should be appreciated that in other embodiments, one or more of the heat exchangers may utilize exhaust gases at other locations in the exhaust system (before the DOC), or EGR gases taken from other points in the exhaust system as the heat source. In still other embodiments, waste heat can be recovered from other sources such as the engine coolant loop, the oil cooler, the engine block, etc. in addition to, or in place of one or more of the described heat exchangers. For example, modern diesel engines may run with engine oil and engine coolant temperatures in the 99-116° C. (210-240° F.) range. The boiling point of DEF is ~105° C. (221° F.) and below the operating temperature of the engine oil and coolants depending on the engine. Hence, we can use some of the waste heat from the radiator or other engine cooling jackets to preheat or pre-boil the DEF, thereby improving the overall efficiency of the reformer. In still other embodiments, the heat exchangers installed on the cylinder block and/or emission control systems (DOC, PDF, and SCR) can be used to transfer heat to the steam reforming system.

In other embodiments, additional heat can be supplied to the reformer by an electric heater or a burner using diesel or some of the hydrogen-rich gas as fuel. Such heaters are particularly useful during engine warmup and extended low load operations where the temperature of the exhaust gas stream tends to drop.

In still other embodiments, small amounts of air can be added to the reformer 120 to oxidize a portion of ammonia and/or hydrogen to generate heat internally. This is similar to autothermal reforming.

In the embodiment illustrated in FIG. 2, the preheaters 123 and 126 and the reformer 120 are shown as separate components for the purposes of explaining their functions.

However, in some various implementations, some or all of the heat exchangers and/or other heaters/burners may be incorporated into the same physical component as the reformer (e.g., the reformer may include heat exchangers, heaters and/or burners as desired).

The hydrogen-rich gas generated by reformer is injected into the engines via any suitable means. For example, the hydrogen-rich gases can be injected; (i) into the intake manifold, the runners between the intake manifold and the intake valves or any other suitable location in the air intake system; (ii) with the fuel or at the fuel inlets; (iii) separately into the cylinders (working chambers); (iv) any other suitable location; or (v) any combination of the foregoing. In current hydrogen injection systems, hydrogen or hydrogen-rich gas is typically injected into internal combustion engines through air intakes. The low explosion limit (LEL) of hydrogen is in the range of 4-75%. Therefore, due to safety concerns, when hydrogen is injected into the air intake system, the hydrogen in the air intake manifold is preferably controlled to be less than 4%. This limits the amount of hydrogen that can be injected into the engines. When hydrogen is injected together with the fuel, a mixing device is used to thoroughly mix the hydrogen-rich gas and engine fuel (e.g., diesel) prior to injection into the engines.

The amount of DEF required for the described hydrogen production is quite small compared to fuel consumption. Preliminary calculations suggest that in some applications, the DEF consumption by volume is roughly 3% of the total fuel consumption which is similar in scale to the volume consumed by the SCR system 60. In practice, the total DEF consumption rate is expected to be less than the sum of the hydrogen generation DEF stream and the conventional SCR DEF stream since overall fuel consumption will be reduced and hydrogen injection has been proven to reduce NOx emissions, both of which result in less DEF consumption by the SCR system. Hence existing DEF tanks are expected to be adequate for use in conjunction with the described DEF based hydrogen generation system, although bigger DEF tanks may be used when desired.

Excess Water

As previously mentioned, DEF is an aqueous solution that is 32.5 wt % urea and 67.5 wt % solution deionized water. The corresponding molar ratio of water to urea in DEF is roughly 6.9 to 1. As seen in (R7) decomposition of urea requires a molecule of water for each molecule of urea.

$$(NH_2)_2CO+H_2O \rightarrow 2NH_3+CO_2 \rightarrow 3H_2+N_2+CO_2 \quad (R7)$$

Since DEF inherently contains water, that water is readily available to support the decomposition. The amount of water in DEF greatly exceeds the amount of water required to support the decomposition of urea and therefore, the reformer exhaust will contain excess steam. The amount of excess water in the hydrogen rich gas generated by the reformer can be seen in the overall DEF decomposition formula (R8) the molar ratio of the outputted steam to the inputted urea is approximately 5.9:1.

$$(NH_2)_2CO+6.9H_2O \rightarrow 3H_2+N_2+CO_2+5.9H_2O \quad (R8)$$

As can be seen in R8, the hydrogen rich gas generated by the reformer 120 includes some Nitrogen, Carbon dioxide and water vapor. However, since each of these additional gases are common in air, they do not adversely impact the operation of the diesel engine, especially when their presence is accounted for by the engine controller. Therefore, the hydrogen rich gas generated by the reformer may be injected into the engine in the same form that they are emitted from the reformer 120 as shown in FIG. 2.

In other embodiments, a steam condenser (not shown) may be used to condense and separate out steam from the hydrogen rich gas before such gases are injected into the engine. This reduces the amount of steam injected into the engine as part of the hydrogen rich gas. The heat exchanger(s) used in the condenser can be cooled by any available medium, including the engine's existing cooling system or air. In still other embodiments, DEF from DEF tank 70 on the way to heat exchanger 123 may be used as the cooling medium for the condenser. Such an arrangement can improve the thermal efficiency of the system.

In still other embodiments, the excess steam can be used for other purposes. For example, the additional steam may be electrolyzed to produce additional hydrogen or can be used to partially reform diesel (or other engine fuels) as described below with reference to FIGS. 3 and 4.

Figure 3:
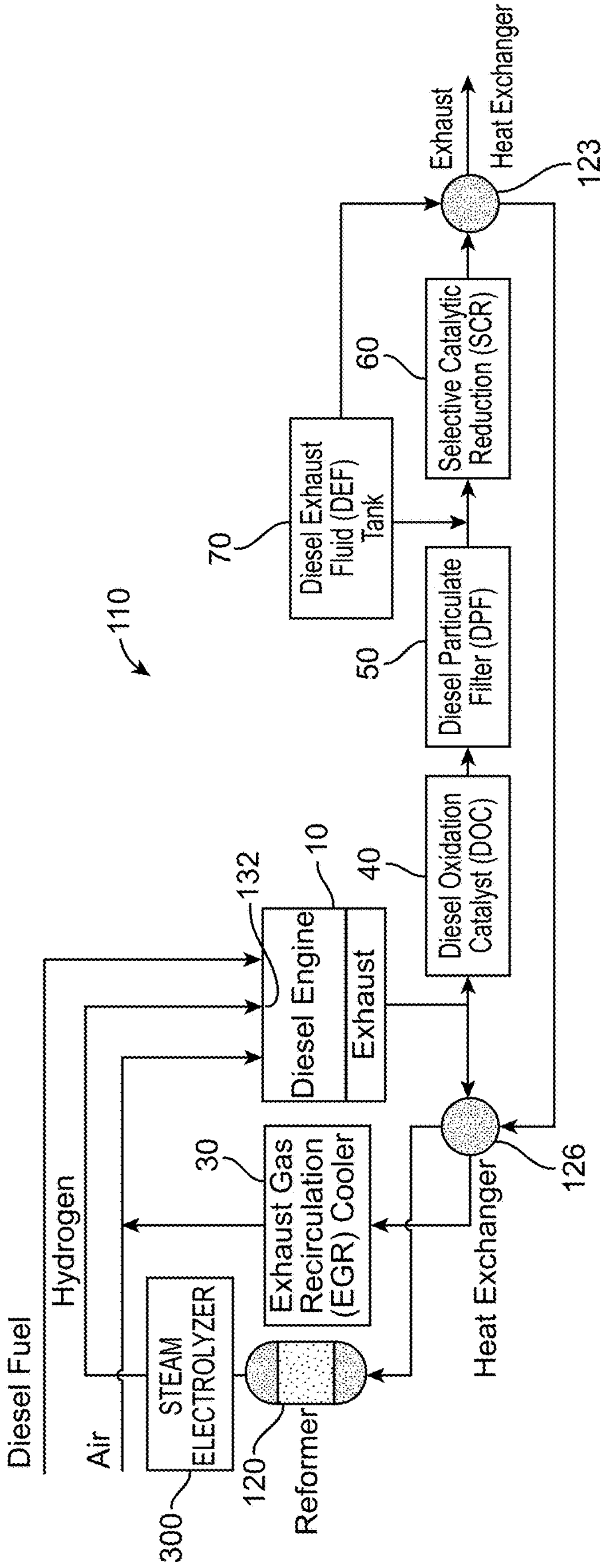
FIG. 3 is a block schematic diagram of a DEF based hydrogen generation system for an engine in accordance with another embodiment that adds a steam electrolyzer to electrolyze water in the hydrogen rich gas generated by a DEF reformer.

FIG. 3 illustrates another embodiment that modifies the design of FIG. 2 by adding a steam electrolyzer 300 downstream of reformer 120. The steam electrolyzer electrolyzes water vapor in the hydrogen rich gases outputted by the reformer 120 thereby generating additional hydrogen (and oxygen) for injection into the engine. As discussed above, the hydrogen rich gases outputted by the reformer have a significant amount of excess steam as illustrated and can be seen in equation (R8), which is reproduced below:

$$(NH_2)_2CO+6.9H_2O \rightarrow 3H_2+N_2+CO_2+5.9H_2O \quad (R8)$$

Full electrolysis of the water in the hydrogen rich gas would nearly triple the available hydrogen as demonstrated by equations (R9) and (R10), with R(9) showing the electrolysis of water in the hydrogen rich gases and (R10) showing the overall reaction of DEF to the decomposed gases after electrolysis.

$$3H_2+N_2+CO_2+5.9H_2O \rightarrow 8.9H_2+N_2+CO_2+2.902 \quad (R9)$$

$$(NH_2)_2CO+6.9H_2O \rightarrow 8.9H_2+N_2+CO_2+2.902 \quad (R10)$$

It should be apparent from the foregoing that full electrolysis of the steam in the hydrogen rich gases is not required to significantly increase the hydrogen content of the hydrogen rich gases.

In general, the energy savings afforded by hydrogen injection of the extra hydrogen produced via steam electrolysis is expected to be significantly higher than the electrical energy costs associated with steam electrolyzing the water vapor in the hydrogen rich gases.

Figure 4:
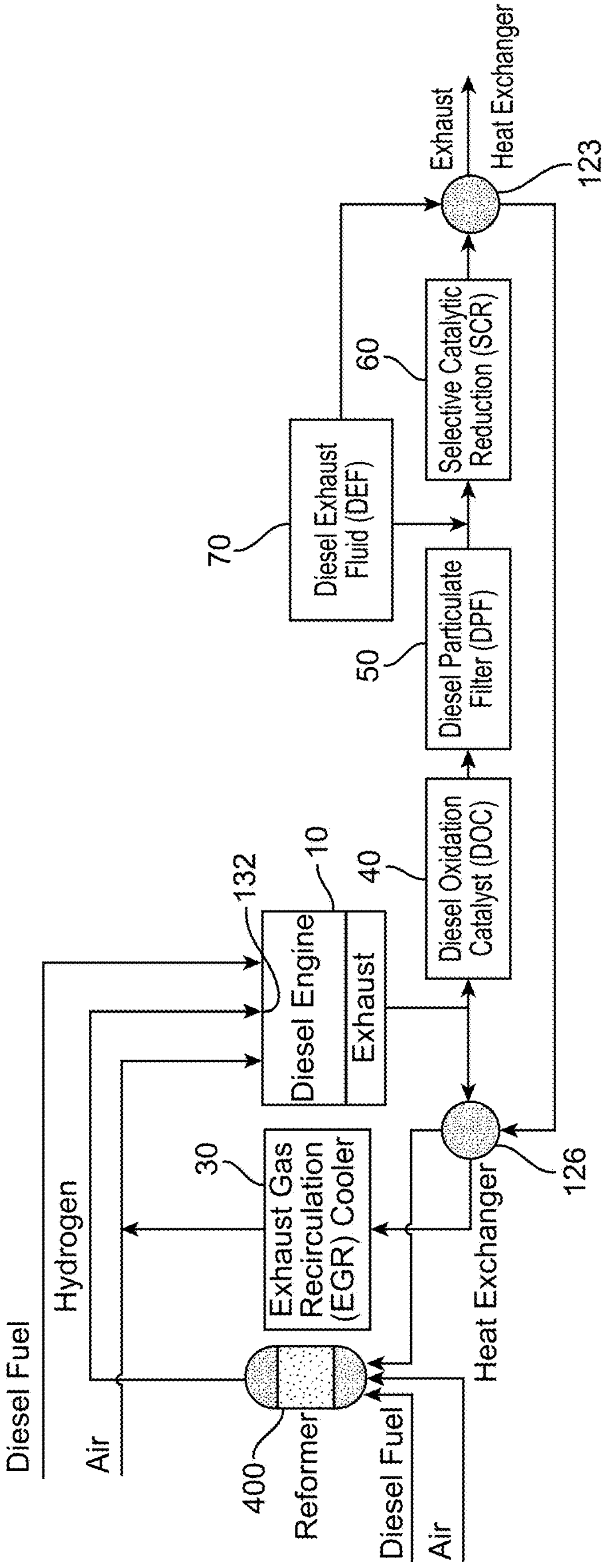
FIG. 4 is a block schematic diagram of a hydrogen generation system in accordance with another embodiment that reforms both DEF and the engine fuel to produce hydrogen.

FIG. 4 illustrates yet another embodiment. This embodiment modifies the design of FIG. 2 by replacing steam reformer 120 with an engine fuel reformer 400 that utilizes DEF as its water source and as a source of additional hydrogen.

Gasoline and diesel fuels can be used to generate hydrogen by steam reforming, autothermal reforming, or catalytic partial oxidation. Catalysts used in the reformers tend to lose their activities because of carbon deposition (i.e., coking), sintering, and sulfur poisoning. Non-catalytic reforming can avoid these issues. Non-catalytic thermal partial oxidation of JP8 fuel has been investigated.[1,2] Scenna et al. discovered that addition of small amount of steam to the partial oxidation (wet partial oxidation) increased reforming efficiency and improved reformate quality.[3] Recently, Kumar et al. demonstrated that non-catalytic autothermal reforming of diesel was feasible.[4] The reforming efficiency increased to 88% by improving the homogeneity of the reactant mixture.

[1] Fuel Processing Technology 2015, 134, 205-213

[2] Development of a Non-Catalytic JP-8 Reformer on 2018 NDIA Ground Vehicle Systems Engineering Symposium, Aug. 7-9, 2018

[3] Int J Hydrogen Energy 2017, 42, 4102-4110

[4] Int J Hydrogen Energy, in press, available online 27 Jun. 2023

In the embodiment illustrated in FIG. 4, a non-catalytic partial oxidation reactor 400 is used to reform engine fuel (e.g., diesel, gasoline, etc.) into hydrogen. DEF is supplied to the reactor as a source of steam and air is supplied as a source of oxygen. Chemically, the DEF is decomposed to hydrogen, Nitrogen, carbon dioxide and water within the reactor 400 in the same manner described above with respect to steam reformation of the DEF. The excess water in the decomposed DEF is used to improve the efficiency of the engine fuel reformation.

Figure 5B:
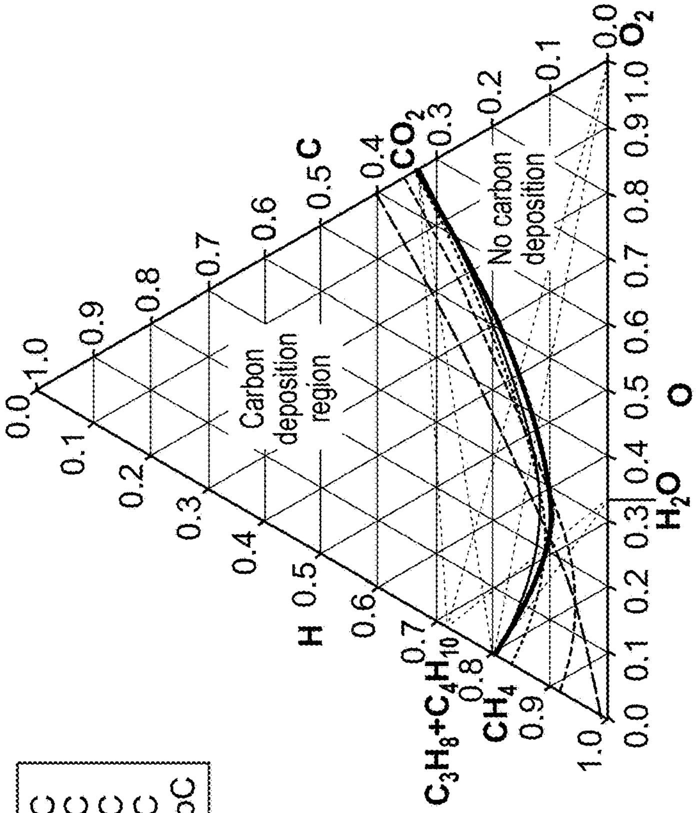
FIG. 5B is a ternary C—H—O diagram at a pressure of 30 bar.
Figure 5A:
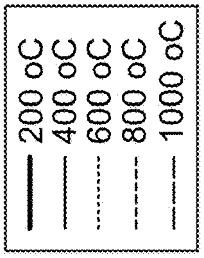
FIG. 5A is a ternary C—H—O diagram at a pressure of 3 bar.
Figure 5A:
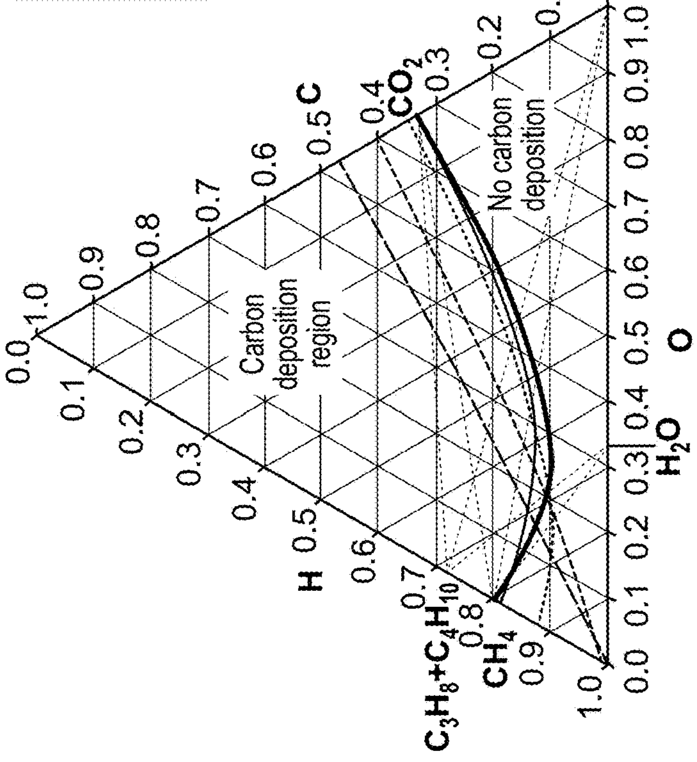

Carbon deposition can occur in fuel reforming. Carbon deposition and deposition-free regions are shown on ternary C—H—O diagrams under thermodynamic equilibrium. As seen in FIGS. 5A and 5B, the deposition boundaries change with temperature and pressure. FIG. 5A shows the deposition boundaries at different temperatures at a pressure of 3 bar, whereas FIG. 5B shows the deposition boundaries at different temperatures at a pressure of 30 bar.

When operating reactor 400, it is important to ensure that the C, H, O atomic composition of the gas mixture within the reactor 400 is in the deposition-free region. The steam to carbon ratio (S/C) can be controlled by controlling the feed rate of the DEF relative to the feed rate of the engine fuel (e.g., diesel). Preferably, the S/C ratio within the reactor is controlled to be in the range of 0-2.0 to 1. In one specific embodiment, the S/C ratio is controlled to be approximately 0.2 to 1. The oxygen to carbon ratio (O/C) can be controlled by controlling the feed rate of air relative to the feed rate of the engine fuel. Preferably, the O/C ratio within the reactor is controlled to be in the range of 0.5-1.5 to 1. In one specific embodiment, the O/C ratio is controlled to be approximately 1 to 1.

Electrolysis of DEF

Figure 6:
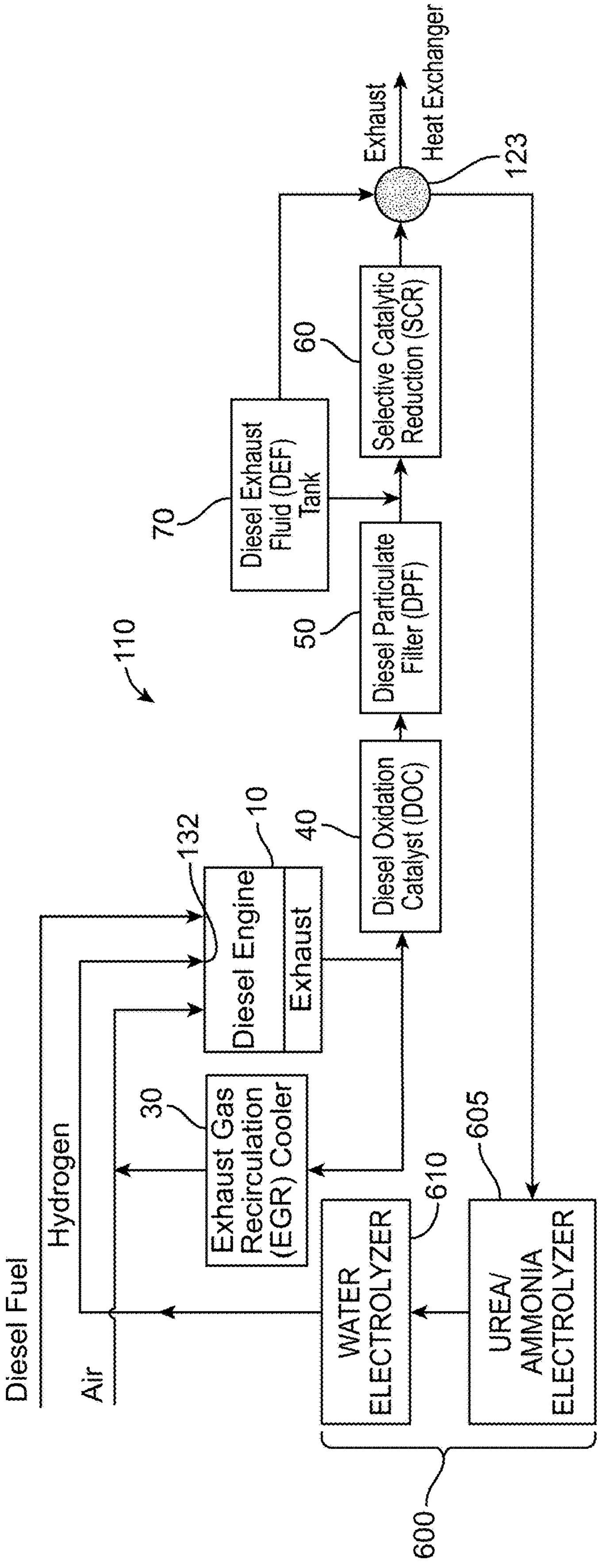
FIG. 6 is a block schematic diagram of a hydrogen generation system in accordance with another embodiment that includes a two stage DEF electrolyzer.

In the embodiments set forth above, reformation of DEF is used (at least in part) to produce the hydrogen rich gas injected in the engine. In other embodiments, the hydrogen can be generated via other means. FIG. 6 illustrated an alternative embodiment in which electrolysis is used to generate hydrogen from the DEF. In this embodiment, the reformer of FIG. 2 is replaced by an electrolyzer 600 and the preheater(s) (represented by heat exchanger 123) are optional. In other respects, the system is similar to the system described above with respect to FIG. 2.

In the illustrated embodiment, preheater/heat exchanger 123 vaporizes the DEF and decomposes the urea to ammonia and carbon dioxide as previously described. The electrolyzer 600 conceptually has two stages. The first stage 605 electrolyzes the ammonia into free hydrogen and nitrogen.

$$2NH_3 \rightarrow 3H_2 + N \quad \text{(R11)}$$

The second stage 610 of electrolyzer 600 electrolyzes the excess water in the DEF based fluid to produce hydrogen and oxygen. Thus, like the system of FIG. 3 100 previously described, when full electrolysis occurs, the output of the electrolyzer 600 conforms to the molar ratios of (R10). That is, for each mole of urea in the DEF introduced into the hydrogen generation system, the electrolyzer will output approximately 8.9 moles of hydrogen, 1 mole of nitrogen, 1 mole of carbon dioxide and 2.9 mols of Oxygen.

The electrolyzer 600 is described as a two stage electrolyzer because the ammonia will electrolyze before the water electrolyzes and uses different electrolysis voltages and different catalysts. Therefore, two-stage electrolyzers are generally preferred with the electrolysis of water occurring in a separate chamber that is located downstream of the chamber in which electrolysis of the ammonia occurs. However, a single chamber electrolyzer could be used in some alternative embodiments.

The embodiment of FIG. 6 preheats the DEF prior to its introduction into electrolyzer 600. Such preheating can be beneficial since it reduces the amount of electrical energy required for electrolysis. However, preheating is not required, and electrolysis can be used to directly decompose urea to hydrogen, nitrogen and carbon dioxide in accordance with (R7).

$$(NH_2)_2CO + H_2O \rightarrow 3H_2 + N_2 + CO_2 \quad \text{(R7)}$$

As described earlier, when preheating is done, the required/desired heat can be obtained from any suitable location. In the illustrated embodiment, waste heat is taken from a location in the exhaust system downstream of the SCR. However, in other embodiments, waste heat can be obtained from other suitable locations, as for example, from other locations in the exhaust system, from locations in the engine or oil cooling systems, etc. as previous described. Also, if/when desired affirmative heaters such as electrical heaters or fuel burners can be used to preheat the DEF.

Modifications

Although only a few embodiments of the invention have been described in detail, it should be appreciated that the invention may be implemented in many other forms without departing from the spirit or scope of the invention. For example, although the foregoing description focuses on the use DEF to produce the hydrogen-rich product gas, it should be appreciated that in alternative embodiments other urea-based fluids having different compositions, as for example: (a) source fluids using different urea/water ratios; and/or (b) source fluids having solvents other than or in addition to water; and/or (c) straight urea—although the use of straight urea requires a separate water source to provide the water necessary for the urea to decompose properly and in the context of a fuel reformer, provide the desired steam content.

The descriptions of some of the embodiments above explain that the urea in the DEF decomposes or at least begins to decompose into ammonia and carbon dioxide within the preheater/heat exchangers. It should be appreciated that to the extent that decomposition of any of the source urea has not completed prior to the DEF-based fluid being delivered to the hydrogen generator, such decomposition can be expected to occur within the hydrogen generator.

Reformation and electrolysis-based hydrogen generators have been primarily described. However, it should be appreciated that in other embodiments, other hydrogen generators can be used to in place of, or in addition to such generators to generate hydrogen from DEF.

Since DEF is widely commercially available at truck stops and other locations that cater to large trucks, the described systems are particularly well suited for use large trucks and other diesel vehicles that utilize DEF for emission control purposes. However, it should be apparent that the described approach can be used in any internal combustion engine that is configured or adapted for hydrogen injection regardless of whether the engine is in a vehicle or whether the engine utilizes DEF in its emission control system. This can include compression ignition engines, spark ignition engines, engines that utilize fuels other than diesel (e.g., gasoline, jet fuels (e.g., Jet A, Jet A1, JP8, JP5, JP4, Jet B, TS-1 etc.), kerosene and kerosene-based fuels, natural gas, LPG and other hydrocarbon gases, etc.) It can also be used in hydrogen enhanced turbine engines, linear engines, rotary engines and other types of hydrogen enhanced engines. Therefore, the present embodiments should be considered illustrative and not restrictive, and the invention is not to be limited to the details given herein, but may be modified within the scope and equivalents of the appended claims.

What is claimed is:

1. A method of operating an engine comprising:
- generating a hydrogen-rich gas from diesel exhaust fluid;
- supplying at least some hydrogen from the hydrogen-rich gas, air and fuel to the engine to provide a hydrogen enhanced air-fuel mixture that includes the supplied hydrogen, air and fuel in the working chamber; and
- operating the engine using the hydrogen enhanced air-fuel mixture.

2. A method as recited in claim 1 wherein the hydrogen-rich gas is formed at least in part by reforming the diesel exhaust fluid.

3. A method as recited in claim 2 further comprising steam electrolyzing water in the hydrogen-rich gas to create additional hydrogen in the hydrogen rich gas.

4. A method as recited in claim 1 further comprising preheating the diesel exhaust fluid prior to reforming the diesel exhaust fluid.

5. A method as recited in claim 4 wherein the diesel exhaust fluid is preheated using heat from exhausts gases generated by operation of the engine.

6. A method as recited in claim 4 wherein the preheating of the diesel exhaust fluid causes at least some urea in the diesel exhaust fluid to convert into ammonia.

7. A method as recited in claim 1 wherein the diesel exhaust fluid is composed of urea and deionized water.

8. A method as recited in claim 7 wherein the diesel exhaust fluid is composed of 32.5 weight percent urea and 67.5 weight percent deionized water.

9. A method as recited in claim 1 wherein diesel exhaust fluid is also introduced into engine exhaust gases outputted by the engine to help reduce nitric oxides in the engine exhaust gases.

10. A method as recited in claim 1 wherein the engine is a compression engine.

11. A method as recited in claim 1 wherein the engine is a diesel engine.

12. A method as recited in claim 1 further comprising condensing and removing water vapor from the hydrogen-rich gas before supplying the at least some hydrogen from the hydrogen-rich gas to the at least one working chamber of the engine.

13. A method as recited in claim 1 wherein the hydrogen-rich gas is generated during operation of the engine.

14. A method as recited in claim 1 further comprising electrolyzing the diesel exhaust fluid to generate the hydrogen-rich gas.

15. A method as recited in claim 14 wherein the electrolyzing of the diesel exhaust fluid includes:
- a first electrolysis stage that electrolyzes urea in the diesel exhaust fluid to generate some hydrogen; and
- a second electrolysis stage that electrolyzes water in the diesel exhaust fluid to generate additional hydrogen.

16. A method of operating an engine comprising:
- heating a urea-based fluid using heat from exhaust gases generated by operation of the engine, the urea-based fluid being received from a tank that stores the urea-based fluid;
- steam reforming the heated urea-based fluid to generate a hydrogen-rich gas;
- electrolyzing water in the hydrogen-rich gas to create additional hydrogen in the hydrogen rich gas;
- supplying air, fuel and at least some hydrogen from the hydrogen-rich gas to the engine to provide a hydrogen enhanced air-fuel mixture; and
- operating the engine using the hydrogen enhanced air-fuel mixture.

17. A method as recited in claim 16 wherein the urea-based fluid is diesel exhaust fluid.

18. A method as recited in claim 16 wherein the hydrogen-rich gas is generated during operation of the engine.

19. A method as recited in claim 16 further comprising, after steam reforming the urea-based fluid, condensing and removing water vapor in the hydrogen-rich gas prior to supplying the at least some hydrogen from the hydrogen-rich gas to the engine.

20. A method of operating an engine comprising:
- electrolyzing a urea-based fluid during operation of the engine to generate a hydrogen-rich gas, the urea-based fluid being received from a tank that stores the urea-based fluid;
- supplying air, fuel and at least some hydrogen from the hydrogen-rich gas to the engine to provide a hydrogen enhanced air-fuel mixture; and
- operating the engine using the hydrogen enhanced air-fuel mixture.

21. A method as recited in claim 20 wherein the electrolyzing of the urea-based fluid includes:
- a first electrolysis stage that electrolyzes urea in the urea-based fluid to generate some hydrogen; and
- a second electrolysis stage that electrolyzes water in the urea-based fluid to generate additional hydrogen.

22. A hydrogen delivery system for delivering hydrogen to an engine in conjunction with delivery of fuel and air to the engine to facilitate use of a hydrogen enhanced air-fuel mixture by the engine, the hydrogen fuel delivery system comprising:
- a diesel exhaust fluid tank;
- a hydrogen generator configured to receive diesel exhaust fluid from the tank and generate a hydrogen rich gas from the diesel exhaust fluid; and
- injectors configured to inject at least some hydrogen from the hydrogen-rich gas into the engine to facilitate use of the hydrogen enhanced air-fuel mixture.

23. A hydrogen delivery system as recited in claim 22 wherein the hydrogen generator is or includes a steam reformer that generates at least some of the hydrogen from the diesel exhaust fluid.

24. A hydrogen delivery system as recited in claim 23 wherein the hydrogen generator further includes a steam electrolyzer that electrolyzes water vapor in gases outputted by the steam reformer to generate additional hydrogen.

25. A hydrogen delivery system as recited in claim 22 wherein the hydrogen generator is or includes an electrolyzer that electrolyzes the diesel exhaust fluid to generate at least some of the hydrogen.

26. A hydrogen delivery system as recited in claim 22 wherein the hydrogen generator is or includes a fuel reformer that generates hydrogen from an engine fuel and the diesel exhaust fluid.

27. A hydrogen delivery system as recited in claim 26 wherein the fuel reformer is a non-catalytic thermal partial oxidation reformer.

28. A hydrogen delivery system as recited in claim 22 further comprising a first heat exchanger that heats diesel exhaust fluid supplied from the tank before such diesel exhaust fluid is conveyed to the hydrogen generator.

29. A hydrogen delivery system as recited in claim 28 wherein the first heat exchanger transfers heat from engine exhaust gases to diesel exhaust fluid passing through or over the heat exchanger to preheat the diesel exhaust fluid.

30. A hydrogen delivery system as recited in claim 28 wherein the first heat exchanger is coupled to an exhaust system associated with the engine and transfers heat from exhaust gases in the exhaust system to diesel exhaust fluid passing through or over the heat exchanger to preheat the diesel exhaust fluid prior to reformation of the diesel exhaust fluid by the reformer.

31. A hydrogen delivery system as recited in claim 22 wherein the injectors inject the hydrogen into at least one selected from the group consisting of:

an intake manifold of the engine;

working chambers of the engine; and runners extending between the intake manifold and working chambers of the engine.

32. A hydrogen delivery system as recited in claim 22 further comprising a condenser configured to condense and remove water from the hydrogen rich gas before the hydrogen rich gas passes to the injectors.

* * * * *